April 12, 1960　　　C. W. ROBINETTE　　　2,932,124
WING CLIP FOR MODEL AIRCRAFT

Filed Nov. 1, 1957

INVENTOR.
CARL W. ROBINETTE
BY
H. W. Brelsford
ATTORNEY

United States Patent Office 2,932,124
Patented Apr. 12, 1960

2,932,124

WING CLIP FOR MODEL AIRCRAFT

Carl W. Robinette, Santa Barbara, Calif.

Application November 1, 1957, Serial No. 693,990

6 Claims. (Cl. 46—79)

My invention relates to toy airplanes and gliders and has particular reference to a clip for attaching wings to the fuselage of an airplane or glider.

Toy airplanes and gliders, generically referred to as toy aircraft, must have the wings adjustably fitted to the fuselage. Slight differences in the weight of fuselage, tail elements and propellers require different wing placement positions on the fuselage. As a result, the wing attachment means must be adjustable to obtain the proper angle of attack and the resultant maximum climb or glide path as the case may be. Additionally, the wing attachment must provide a shock absorbing function. The fuselages of toy aircraft are generally relatively stout compared to the wings which generally are fragile. All too commonly the aircraft strikes the ground or other object and unless the shock absorbing function is present the wings will be destroyed.

Because of the bulk of fully assembled toy aircraft, the great majority of toy aircraft are sold in compact kits wherein the wing halves are generally separate and are packaged in a flat container. This requries the purchaser to assemble the wings and other parts to the fuselage. A relatively simple structure is required inasmuch as most purchasers are young and deficient in manual dexterity and tool handling. Additionally, dihedral angle and wing camber are essential for satisfactory performance. The wing attaching means must provide these while maintaining its simplicity of structure.

Various attempts have been made to provide a wing clip or equivalent structure that meets these commercial requirements. Resilient wing gripping members have been used that also grip the fuselage. More commonly simple slots have been provided in the fuselage or a slotted block has been attached to the fuselage. Rubber bands have been used to obtain shock absorbing and adjustment functions. These and various other structures have not satisfactorily solved the problem which persists despite the fact that toy aircraft sales exceed a million units per year.

I have devised a wing clip structure that has been thoroughly tested in its commercial form. I have devised a two-piece wing clip which may be made inexpensively from plastic injection moldings and yet is strong, durable and simple. I provide a stationary plate with a downwardly projecting stem so that the stationary part is T shaped in cross section. A movable clamp plate passes over the stem of the T member to assume a spaced relationship to the stationary plate that forms the cross arm of the T. Special locking fingers are provided, particularly in accordance with the invention, to hold the clamp plate in this space relationship. Wing members may be friction fitted into the slot thus formed on each side of the stem of the T, or the clamp plate may be moved against the stationary plate to clamp these wing members. The slots thus defined may be curved to provide wing camber and by having the wing ends at the fuselage line cut at an angle, sweepback may be provided. The two slots are preferably disposed at an angle to provide a dihedral angle for the wings.

In addition to providing a wing clip, I have combined a nose weight structure. It is well known that toy gliders especially must have the nose weighted to give proper fuselage balance. This is less necessary on toy airplanes as the propeller satisfies this weight requirement. I have discovered that this weight can vary in position with the wing position on the fuselage. Thus I have made this weight integral with my wing clip. Preferably it is made in decorative form to simulate a cockpit, cabin or other forward portion of an airplane. Additionally also, it provides extra structure whereby the wing clip may be secured to the fuselage.

It is a principal object of my invention to provide an improved wing clip for model aircraft.

Another object is to provide a two piece wing clip wherein a clamp plate grips wing halves against a stationary plate.

Another object is to provide a wing clip wherein a locking device holds a clamp plate in a predetermined relation to a stationary plate.

Still another object is to provide a combined nose weight and wing clip for model aircraft.

Other objects, features and advantages of my invention will be apparent in the following description and claims considered together with the accompanying drawings forming an integral part of this disclosure and in which:

Figure 1:
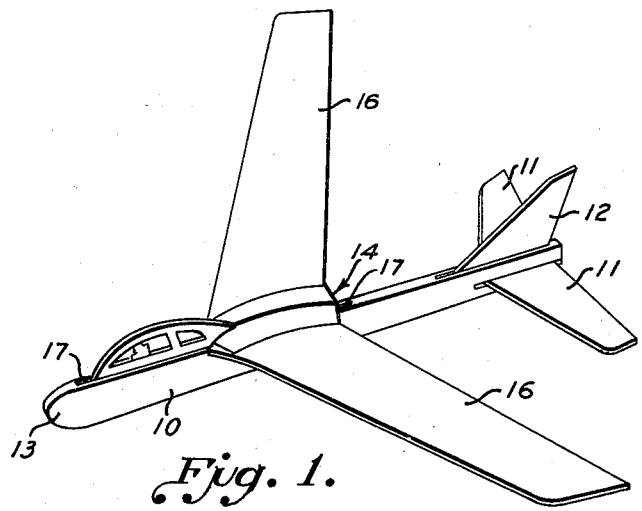
Fig. 1 is a perspective view of a model glider incorporating the invention for holding wing portions to a fuselage.

Referring to Fig. 1 the invention is illustrated with respect to a glider type of aircraft, although other toy aircraft may suitably employ the invention. A fuselage 10 may have the usual control members at its rear end including elevator surfaces 11 and a rudder surface 12. The forward nose portion of the fuselage 10 may be rounded or otherwise shaped as at 13. Secured to the fuselage 10 may be a wing clip 14 provided particularly in accordance with this invention and which grips wing halves 16 rigidly with respect to each other. The wing clip 14 may be secured to the fuselage 10 in any desired manner and it is preferred at present to insert the device in a slot 17 in the fuselage 10 where it is retained by frictional contact with the fuselage.

Figure 4:
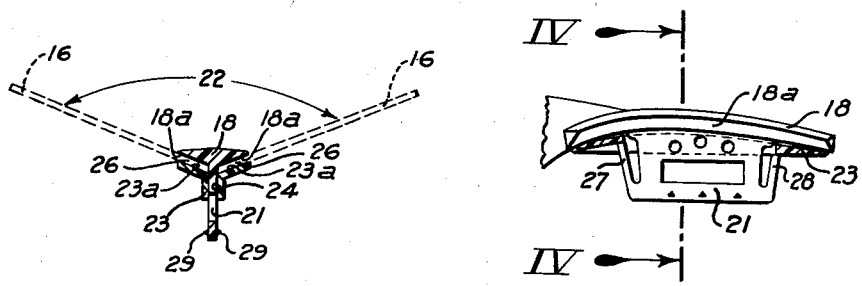
Fig. 4 is a sectional view along the line IV—IV of Fig. 3.

Referring to the other figures, the device 14 has a stationary clamp plate 18 to which may be integrally formed or connected a nose weight portion 19 which may be decoratively shaped as illustrated in the form of a cockpit and pilot. The stationary or fixed plate 18 has a downwardly depending shank member 21 so that the device is generally T-shaped in cross section as illustrated most clearly in Fig. 4. This stationary plate 18 may have its undersides 18a curved to define wing camber as illustrated in Figs. 2 and 3 and additionally, these under surfaces may be at an angle to each other as illustrated most clearly in Fig. 4 to also define a dihedral angle 22 for the wings.

A movable plate 23 cooperates with the fixed plate 18 to form a slot between them in which may be inserted the wing segments 16 which may, for example, be formed of sheet balsa wood or other suitable material. The movable plate 23 is preferably centrally apertured with an elongated slot 24 so that this movable plate 23 may slide over the shank 21 of the T shape to move into spaced relationship with the fixed plate 18. The movable plate 23 may have its upper surfaces 23a shaped in complementary fashion to the surfaces 18a to define a wing slot 26 between the two plates as illustrated most clearly in Fig. 4.

Figure 2:
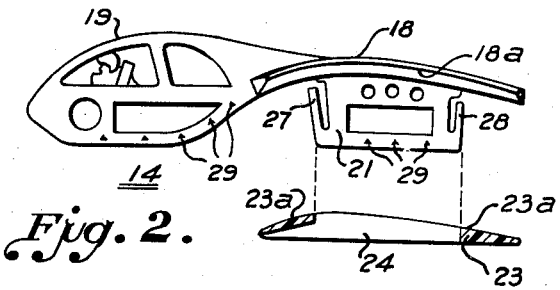
Fig. 2 is an exploded elevation view particularly in section of the wing clip member of Fig. 1.
Figure 3:
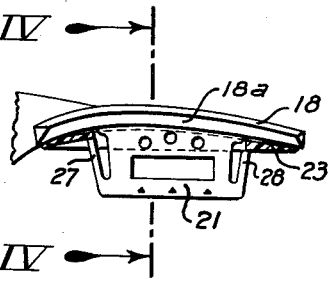
Fig. 3 is an elevation view of the wing clip portion only of the device of Fig. 2 while in its assembled position with the movable plate being in section.
Figure 5:
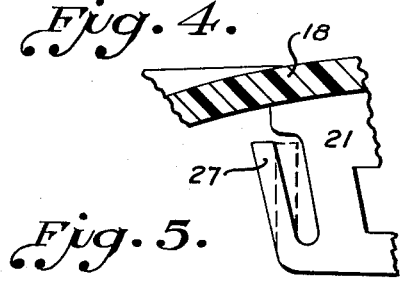
Fig. 5 is an enlarged fragmentary elevation view particularly in section of the finger locking mechanism of the wing clip.

The mechanism for holding the movable plate 23 in spaced relationship to the fixed plate 18 is provided particularly in accordance with the invention and is illustrated in Figs. 2, 3 and 5. There is provided at each end of the elongated T shank 21 movable fingers 27 and 28. These fingers may be moved inwardly toward the shank 21 as shown in dotted outline in Fig. 2. This permits the apertured movable plate 23 to slide over the shank 21 even though there is an interference fit between the aperture 24 and the fingers 27 and 28 as illustrated most clearly in Fig. 2. When the movable plate 23 assumes its spaced relationship as shown in Fig. 3 these fingers 27 and 28 may be moved outwardly from the shank 21 to engage the plate 23 to hold it solidly in its elevated position.

While the wing clip of the invention may be formed of any suitable material it is preferred at present to form it from moldings of organic plastic material and injection moldings have proved most suitable for this purpose. Material properly selected will give the fingers 27 and 28 an elastic movement so that they can be depressed as shown in Fig. 5 and then spring outwardly as shown in Fig. 3. A non-elastic material, however, works quite well with manipulation of the fingers and pivoted or other hinged mountings could likewise be suitably used. It has been found convenient to place pointed projections 29 on the shank member 21 as well as on the nose weight 19 to help retain the entire wing clip in the fuselage. Fuselages made of wood and slotted have a normal resilience that is sufficient to enable the gripping of the wing clip and this grip is amply sufficient for flying purposes for the aircraft and yet under shock of a collision landing the entire wing clip will break free so that the wings remain undamaged.

In operation two principal modes have proved satisfactory. The wing segments 16 may be placed against the under side of the fixed plate 18 and the movable plate 23 moved over the shank 21 against the wing portions. By properly selecting the wing thicknesses with respect to the fingers 27 and 28 these wing segments will be tightly gripped when the plate 23 reaches the snap out position for the fingers 27 and 28. Alternatively, the movable plate 23 may be assembled to the stationary plate 18 before inserting the wings and the wings may thereafter be inserted in the slots 26 thus formed between the fixed and the movable plates. The entire device together with the nose weight 19 is then inserted in a slot in a fuselage, or any other suitable attaching mechanism may be employed.

It will be noted particularly with respect to Fig. 3 that it is desirable that the movable plate 23 be of a somewhat more shallow curvature than the fixed plate 18 so that the forward and rear end of the movable plate come in closer contact with the fixed plate. This, together with the inherent resilience of the movable plate forms an elastic pressure against the fingers 27 and 28 to hold them in position and in addition gives the leading and trailing edges of the wings a very tight grip. Likewise, the two opposite plate surfaces may be slightly out of parallelism to enable the resilience of the movable plate to exert a greater gripping action. The ends of the wing segments 16 positioned in the wing clip may be at any desired angle with respect to the wing axis to give the desired sweep back angle to the wings. The T shank 21 may be suitably apertured to relieve weight as well as to increase gripping effect in the fuselage slot and the same is true of the nose weight 19.

While the invention has been described with respect to a specific embodiment thereof it is not limited to that embodiment, nor otherwise, as all modifications and variations coming within the true spirit and scope of the invention are included within the following claims.

I claim:

1. In combination with a model aircraft fuselage that is longitudinally slotted, a wing clip for securing wing halves to the fuselage comprising: an elongated member of T-shaped cross section wherein the shank of the T fits within the fuselage slot and the T cross arm forms a fixed plate; a longitudinally slotted movable plate guided at its slot on the shank for movement toward the fixed plate; and a movable finger secured to each end of the T shank and pointing toward the fixed plate and having its end spaced from the fixed plate, whereby movement of the finger outwardly from the shank engages the movable plate to hold it in spaced relationship to the fixed plate.

2. A wing clip and fuselage combination as defined in claim 1 wherein at least one of the plates is curved to define camber for a sheet wing which may be inserted between the two plates.

3. A wing clip and fuselage combination as defined in claim 1 wherein the movable fingers are normally biased to project into the path of the movable plate.

4. A wing clip and fuselage combination as defined in claim 1 wherein the elongated member is formed of organic plastic and the fingers are integrally formed on the T shank and are normally biased into the path of the movable plate and depend upon elasticity of the plastic to move out of the path of the movable plate and to spring outwardly into the path of the movable plate when the movable plate has passed the ends of the fingers.

5. A wing clip and fuselage combination as defined in claim 1 wherein the T shank carries projections on opposite sides of the T shank to assist in gripping the fuselage.

6. A wing clip and fuselage combination as defined in claim 1 wherein the under surfaces of the T cross arm are at an angle to each other to define an aircraft dihedral angle for wing segments held in the clip.

References Cited in the file of this patent

UNITED STATES PATENTS

| 2,171,925 | Fitts | Sept. 5, 1939 |
| 2,724,211 | Bloom | Nov. 22, 1955 |

FOREIGN PATENTS

| 589,169 | Great Britain | June 12, 1957 |